(12) United States Patent
Damstedt et al.

(10) Patent No.: US 9,540,240 B2
(45) Date of Patent: Jan. 10, 2017

(54) SOOT CONTROL IN OXIDATION REACTIONS

(71) Applicants: Bradley Damstedt, Williamsville, NY (US); Lawrence Bool, East Aurora, NY (US); Michael Riley, Greenwood, IN (US)

(72) Inventors: Bradley Damstedt, Williamsville, NY (US); Lawrence Bool, East Aurora, NY (US); Michael Riley, Greenwood, IN (US)

(73) Assignee: PRAXAIR TECHNOLOGY, INC., Danbury, CT (US)

( * ) Notice: Subject to any disclaimer, the term of this patent is extended or adjusted under 35 U.S.C. 154(b) by 232 days.

(21) Appl. No.: 14/306,428

(22) Filed: Jun. 17, 2014

(65) Prior Publication Data

US 2014/0367614 A1 Dec. 18, 2014

Related U.S. Application Data

(60) Provisional application No. 61/835,842, filed on Jun. 17, 2013.

(51) Int. Cl.
 *C01B 3/38* (2006.01)
 *C01B 3/36* (2006.01)
(52) U.S. Cl.
 CPC ......... *C01B 3/36* (2013.01); *C01B 2203/0255* (2013.01)

(58) Field of Classification Search
 CPC .................... C01B 3/36; C01B 2203/0255
 USPC .................................................. 252/373
 See application file for complete search history.

(56) References Cited

U.S. PATENT DOCUMENTS

| 3,682,605 | A | 8/1972 | Wada |
| 4,842,509 | A | 6/1989 | Hasenack |
| 5,266,024 | A | 11/1993 | Anderson |
| 5,886,056 | A | 3/1999 | Hershkowitz |
| 5,980,596 | A * | 11/1999 | Hershkowitz .......... B01J 8/0278 422/198 |
| 7,534,276 | B2 | 5/2009 | Licht |
| 2002/0031690 | A1* | 3/2002 | Shimazu ................. B01B 1/005 429/425 |
| 2009/0229182 | A1* | 9/2009 | Raman ....................... C10J 3/00 48/127.7 |
| 2011/0036011 | A1* | 2/2011 | Sprouse .................. F23D 1/005 48/76 |

FOREIGN PATENT DOCUMENTS

| DE | 1911606 A1 | 9/1970 |
| WO | WO 9849091 A1 | 11/1998 |

OTHER PUBLICATIONS

Cetegen, B. M. et al. "Soot topography in a planar diffusion flame wrapped by a line vortex". ScienceDirect, Combustion and Flame, *Elsevier*, V146, I4, (Sep. 2006), pp. 687-697.

* cited by examiner

*Primary Examiner* — Paul Wartalowicz
(74) *Attorney, Agent, or Firm* — Donald T. Black

(57) ABSTRACT

Soot formation in the partial oxidation of carbonaceous feed is controlled by controlling the momentum of the oxidant stream relative to the momentum of the carbonaceous feed stream.

14 Claims, 1 Drawing Sheet

SOOT CONTROL IN OXIDATION REACTIONS

FIELD OF THE INVENTION

The present invention relates to improvements in methods of converting or altering the hydrocarbon content of feed streams by the use of oxygen at elevated temperature. Many embodiments of such methods are known as "partial oxidation".

BACKGROUND OF THE INVENTION

Partial oxidation and similar operations involve contacting hydrocarbons with oxygen under conditions that form a gaseous product stream having a desired composition of gaseous components. However, past experience has shown that the gaseous product stream often contains solid particulate byproducts such as soot, especially when the gaseous product stream is produced under conditions that are intended to retain a significant component of one or more hydrocarbon components by not fully reacting or combusting them. These solid particulate byproducts may also be present when the partial oxidation reactions take place at low temperatures. That is, if the reaction conditions do not achieve complete oxidation of all oxidizable components that are present, or if the reactor temperature is low, then some unoxidized matter that is present in the product stream would be expected to be in the solid phase. Alternately the reaction conditions could be such that the cracking temperature of the feed is exceeded without adequate conversion of the feed to a gaseous product stream. The solid particulate byproduct is referred to generally as "soot" and may comprise elemental carbon, and/or carbon-containing hydrocarbons. The presence of this material in the product stream from the partial oxidation operation is often undesirable. However, previous efforts to lower the amount of this material that is in the product stream have required sacrificing yield, or increasing the usage of reactants such as oxygen, which are approaches that have drawbacks.

BRIEF SUMMARY OF THE INVENTION

One aspect of the present invention is an improved method of treating a gaseous feed material that contains one or more hydrocarbons, the method comprising adding together a hot oxidant stream containing oxygen with a feed stream of the gaseous feed material, to mix under reaction conditions effective to partially oxidize one or more hydrocarbons in said feed material to produce a product stream that contains hydrogen and CO, while maintaining the ratio of the momentum of the oxidant stream relative to the momentum of the feed stream, when the oxidant stream is added to the feed stream, so that the soot content of the product stream is less than 5 gm/Nm$^3$ higher (or in other embodiments less than 2 gm/Nm$^3$ higher, or even less than 1 gm/Nm$^3$ higher) than the soot content of the feed stream.

A preferred embodiment of the present invention is an improved method of treating a gaseous feed material that contains one or more hydrocarbons, the method comprising adding together a hot oxidant stream containing oxygen with a feed stream of the gaseous feed material, to mix under reaction conditions effective to partially oxidize one or more hydrocarbons in said feed material to produce a product stream that contains hydrogen and CO, while maintaining the ratio of the momentum of the oxidant stream relative to the momentum of the feed stream, when the oxidant stream is added to the feed stream, so that said ratio is less than the ratio of the momentum of the oxidant stream relative to the momentum of the feed stream at which, under otherwise identical reaction conditions, the soot content of the product stream is 5 gm/Nm$^3$ higher (or in other embodiments 2 gm/Nm$^3$ higher, or even 1 gm/Nm$^3$ higher) than the soot content of the feed stream to which the oxidant stream is added.

That is, the aforementioned momentum ratio of the oxidant stream to the feed stream is controlled so that the soot content of the product is less than 5 gm/Nm$^3$, more preferably less than 2 gm/Nm$^3$ or even less than 1 gm/Nm$^3$, higher than the soot content of the feed stream.

Another preferred embodiment of the present invention is an improved method of treating a gaseous feed material that contains one or more hydrocarbons, the method comprising adding together an oxidant stream containing oxygen with a feed stream of the gaseous feed material, to mix under reaction conditions effective to partially oxidize one or more hydrocarbons in said feed material to produce a product stream that contains hydrogen and CO, under reaction conditions, including the temperature of the feed stream, the temperature of the oxidant stream, and the stoichiometric ratio, under which if the partial oxidation reaction is practiced with a given ratio of the momentum of the oxidant stream relative to the momentum of the feed stream (when the streams are added together) the soot content of the product stream would be 5 gm/Nm$^3$ higher than the soot content of the feed stream, and carrying out the partial oxidation reaction with a ratio of the momentum of the oxidant stream relative to the momentum of the feed stream when the streams are added together that is less than the given ratio but under otherwise identical reaction conditions, wherein the soot content of the product stream is less than 5 gm/Nm$^3$ higher than the soot content of the feed stream.

In preferred embodiments of the foregoing, the momentum ratio of the oxidant stream relative to that of the feed stream when the oxidant stream is added to the feed stream, is also controlled to be high enough that at least 50% of the hydrocarbon material in the feed stream is converted to CO, hydrogen, or other hydrocarbon material.

In other preferred embodiments of the foregoing, the product stream contains methane, and the aforementioned momentum ratio and the temperature of the oxidant stream added to the feed stream are also controlled to control the amount of methane in the product stream.

As used herein, the "momentum" of a stream is the mass flow rate of the stream times the average velocity of the stream across the plane perpendicular to the stream's direction of flow.

As used herein, "soot" is carbon-containing solid particulate matter less than one micron in width.

DETAILED DESCRIPTION OF THE INVENTION

The gaseous feed material that can be treated by the present invention can generally include any of many compositions, from any of many possible sources. For instance, the gaseous feed material can comprise methane or natural gas. As another example, the gaseous feed material may contain one or both of hydrogen and CO, may contain water vapor, and may contain one or more light hydrocarbons selected from the group consisting of methane, hydrocarbons containing 2 to 8 carbon atoms and 0 to 2 oxygen atoms, and mixtures thereof. The gaseous feed material may contain solid particulate matter such as ash, char and/or tars (which may contain species with more than 8 carbon atoms). The gaseous feed material may also contain nitrogen and/or carbon dioxide.

The gaseous feed material may be obtained from, or produced by, any of numerous sources. For example, the gaseous feed material can be:

produced by gasification or pyrolysis of biomass material (examples of which include algae or material containing any of cellulose or hemicellulose or lignin, including but not limited to municipal solid waste (MSW), wood (including wood chips, cut timber; boards, other lumber products, and finished wooden articles, and wood waste including sawdust, and pulpwood from a variety of trees including birch, maple, fir, pine, spruce), and vegetable matter such as grasses and other crops, as well as products derived from vegetable matter such as rice hulls, rice straw, soybean residue, corn stover, and sugarcane bagasse;

produced by gasification or pyrolysis of carbonaceous feedstocks such as coal, coke, or petroleum coke, en example of which is coke oven gas;

an offgas stream produced in a blast furnace;

other gas streams commonly used as fuel, such as natural gas;

hydrocarbon-containing byproduct gas streams from industrial processes;

and syngas produced by reforming of any of the foregoing.

Figure 1:
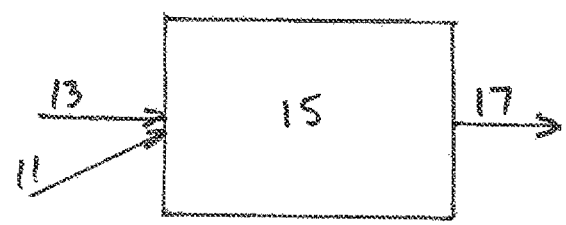
FIG. 1 is a schematic flowsheet of an embodiment of the partial oxidation of the present invention.

Referring to FIG. 1, stream 11 represents the gaseous feed material described herein. Stream 11 is fed to reactor 15 in which it is mixed with hot oxidant stream 13. Stream 11 as fed to reactor 15 can be at a temperature from ambient up to a temperature below the temperature at which the component that is most prone to undergo thermal cracking would begin to undergo thermal cracking, and preferably up to 100° F. below that temperature. Stream 11 can be at such a temperature as produced from an upstream processing step, or it can be heated to such a temperature in a heat exchanger or heater. It will be appreciated that the feed stream temperature that best achieves the desired partial oxidation reaction for any given composition of feed material may vary depending on the composition of the feed material and on the desired degree of conversion in the partial oxidation reactions.

Hot oxidant stream 13 typically has a temperature of 1000° F. to 4800° F., preferably 2800° F. to 4500° F. The oxygen content of oxidant stream 13 is typically at least 50 vol. % and preferably at least 80 vol. %. The hot oxidant stream having these characteristics can be formed by any of numerous techniques. A preferred technique to produce a useful hot oxidant stream is described as follows, referring to FIG. 2.

Figure 2:
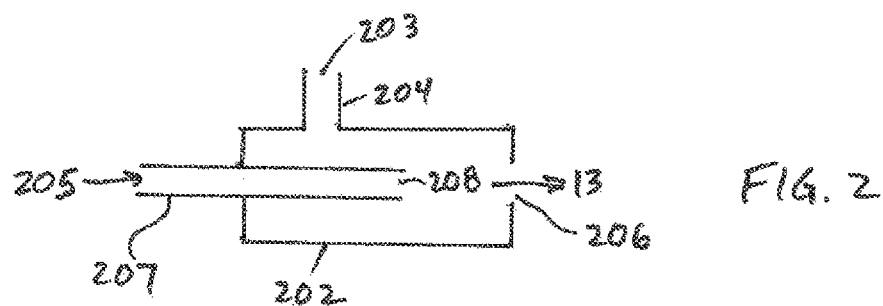
FIG. 2 is a cross-sectional view of apparatus useful to produce a stream of hot oxygen useful in the present invention.

Referring to FIG. 2, stream 13 of hot oxygen can be provided by providing stream 203 of oxidant having an oxygen concentration of at least 30 volume percent and preferably at least 85 volume percent into a hot oxygen generator 202 which is preferably a chamber or duct having an inlet 204 for the oxidant 203 and having an outlet nozzle 206 for the stream 13 of hot oxygen. Most preferably the oxidant 203 is technically pure oxygen having an oxygen concentration of at least 99.5 volume percent. The oxidant 203 fed to the hot oxygen generator 202 has an initial velocity which is generally within the range of from 50 to 300 feet per second (fps) and typically will be less than 200 fps.

Stream 205 of fuel is provided into the hot oxygen generator 202 through a suitable fuel conduit 207 ending with nozzle 208 which may be any suitable nozzle generally used for fuel injection. The fuel may be any suitable combustible fluid examples of which include natural gas, methane, propane, hydrogen and coke oven gas, or may be a process stream such as stream 25 obtained from stream 19. Preferably the fuel is a gaseous fuel. Liquid fuels such as number 2 fuel oil or byproduct stream 23 may also be used, although it would be harder to maintain good mixing and reliable and safe combustion with the oxidant with a liquid fuel than with a gaseous fuel.

The fuel 205 provided into the hot oxygen generator 202 combusts therein with oxidant 203 to produce heat and combustion reaction products such as carbon dioxide and water vapor.

The combustion reaction products generated in the hot oxygen generator 202 mix with the unreacted oxygen of the oxidant 203, thus providing heat to the remaining oxygen and raising its temperature. Preferably, the fuel 205 is provided into the hot oxygen generator 202 at a velocity that is suitable to sustain a stable flame for the particular arrangement of nozzle 208 within generator 202. The velocity of the fuel at nozzle 208 serves to entrain oxidant into the combustion reaction thus establishing a stable flame.

Figure 3:
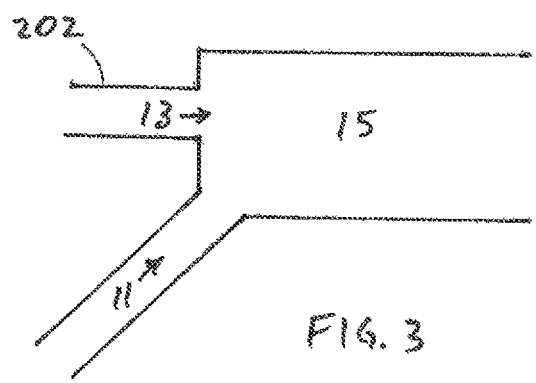
FIG. 3 is a cross-sectional view of a partial oxidation reactor, showing representations of an embodiment of the present invention.

Generally the temperature of remaining oxidant within the hot oxygen generator 202 is raised by at least about 500° F., and preferably by at least about 1000° F. The hot oxygen stream 13 obtained in this way is passed from the hot oxygen generator 202 into reactor 15 through a suitable opening or nozzle 206 (seen in FIG. 3) as a high velocity hot oxygen stream having a temperature of at least 2000° F. Generally the velocity of the hot oxygen stream will be within the range of from 500 to 4500 feet per second (fps), and will typically exceed the velocity of stream 203 by at least 300 fps.

The composition of the hot oxygen stream 13 depends on the conditions under which the stream is generated, but preferably it contains at least 50 vol. % $O_2$ and may be 90 vol. % $O_2$ or higher. The formation of the high velocity hot oxygen stream can be carried out in accordance with the description in U.S. Pat. No. 5,266,024. It will be appreciated that the oxidant stream temperature that best achieves the desired partial oxidation reaction for any given composition of feed material may vary depending on the composition of the feed material and on the desired degree of conversion in the partial oxidation reactions.

The partial oxidation reaction is carried out by feeding the feed stream 11 and the hot oxidant stream 13 together so that they mix together within reactor 15. Reactor 15 can be any reactor capable of withstanding the temperatures encountered during the reaction. A preferred example is a refractory-lined chamber having suitable inlets and exit for the streams described herein.

The feed stream 11 and the oxidant stream 13 should be fed to mix with each other at relative mass rates that represent a stoichiometric ratio ("SR") of 0.05 to 0.5 and preferably 0.1 to 0.3, where the SR is defined as the ratio in moles of the amount of oxygen fed to the amount of oxygen that would be required to completely all hydrocarbon material fed to carbon dioxide and water. It will be appreciated that the SR that best achieves the desired partial oxidation reaction for any given composition of feed material may vary depending on the composition of the feed material and on the desired degree of conversion in the reaction.

The reaction of components of the feed stream 11 with the oxygen in oxidant stream 13 produces reaction products which emerge from reactor 15 as product stream 17. Mixing can be promoted by feeding one stream into the other stream, or by use of mechanical adjuncts such as swirl vanes.

As has been described herein, the mixing of the feed stream 11 and the oxidant 13 under the conditions described herein promotes partial oxidation of components of the feed stream. Product stream 17, which exits from reactor 15, contains the partially oxidized material, as well as any unreacted components. Higher temperatures of the product stream tend to be associated with higher degrees of oxidation, which can reduce the yield of compounds such as methane. Higher SR values are likewise associated with higher degrees of oxidation. Higher SR values are also associated with reduced formation of soot, which would lead to the expectation that increasing the amount of oxygen present relative to the feed stream would favor reduced soot formation.

It has been discovered that the tendency of the partial oxidation to produce soot in product stream 17 can be lessened and maintained at a desired lessened value, or within a range of lessened values, or even avoided, by maintaining, which is to say lessening, the ratio of the momentum of the hot oxidant stream 13 relative to the momentum of the feed stream 11 with which oxidant stream 13 is added together.

Thus, in one embodiment of this discovery, the ratio of the momentum of the oxidant stream, relative to the momentum of the feed stream when the oxidant stream is added together with the feed stream, is maintained or controlled so that this momentum ratio is less than the momentum ratio at which, under otherwise identical reaction conditions, the soot content of the product stream is 5 gm/Nm$^3$ higher than the soot content of the feed stream to which the oxidant stream is added. A soot content of 5 gm/Nm$^3$ (that is, grams of soot per volume of the stream in cubic meters normalized to 25° C. and 1 atm pressure) comprises enough soot to be visible in the stream and to darken in a matter of minutes a soot filter placed in the stream.

In a preferred embodiment, the ratio of the momentum of the oxidant stream, relative to that of the feed stream when the oxidant stream is added together with the feed stream, is controlled or maintained so that this ratio of momentums is less than the ratio of these momentums at which, under otherwise identical reaction conditions, the soot content of the product stream is 5 gm/Nm$^3$ higher than the soot content of the feed stream to which the oxidant stream is added. That is, even under reaction conditions under which the soot content of the product stream is only 5 gm/Nm$^3$ higher than that of the feed stream, the present invention is able to achieve a lessening of the soot content of the product stream by lessening the ratio of the momentum of the oxidant stream 13 relative to that of the feed stream 11.

In a more preferred embodiment, the ratio of the momentum of the oxidant stream, relative to that of the feed stream when the oxidant stream is added to the feed stream, is controlled so that the ratio of these momentums is less than the momentum ratio of these streams at which, under otherwise identical reaction conditions, the soot content of the product stream is 2 gm/Nm$^3$ higher or even 1 gm/Nm$^3$ higher than the soot content of the feed stream with which the oxidant stream is added to be mixed together.

The reduction of the soot content of the product stream 17 relative to the soot content of the feed stream 11 is expressed herein as a simple arithmetic difference (not a ratio). For example, if the feed stream 11 has a soot content of 1 gm/Nm$^3$ and the product stream 17 from partial oxidation of stream 11 has a soot content of 4 gm/Nm$^3$, the soot content of product stream 17 will be said to be 3 gm/Nm$^3$ higher than the soot content of the feed stream. Feed stream 11 may contain solids such as ash and/or tar, so if such materials are present they may pass through reactor 15 to product stream 17 in which case it may not always be possible to reduce the total solids content of the product stream 17 all the way to zero. The soot contents and solids contents of the feed stream and of the product stream can readily be determined using conventional techniques known in this field.

The aforementioned ratio of the momentum of the oxidant stream to the momentum of the feed stream can be controlled in any of several ways.

One way is to control the momentum of the oxidant below the level at which the soot content of the product stream exceeds the values indicated herein. This can be practiced by passing oxidant stream 13 into reactor 15 through a suitably dimensioned orifice 206 (from which the oxidant stream emerges into feed stream 11) that is larger than the orifice used in operations that produced higher amounts of solid particulate byproduct including soot. The momentum of oxidant stream 13 can also be controlled on an ongoing basis by use of valves through which the oxidant stream passes, which can be adjusted to adjust the rate of flow of the oxidant stream into reactor 15.

Another way to maintain the ratio of the momentum of the oxidant stream to the momentum of the feed stream at a suitably controlled level to lessen or avoid the presence of soot in the product stream, is to increase the momentum of the feed stream above the level at which the soot content of the product stream exceeds the values indicated herein. This can be practiced by passing feed stream 13 into reactor 15 through a suitably dimensioned orifice that is smaller than the orifice used in operations that produced higher amounts of soot. The momentum of feed stream 11 can also be controlled on an ongoing basis by use of valves through which the feed stream passes, which can be adjusted to adjust the rate of flow of the feed stream into reactor 15.

Other ways to control either stream's momentum include increasing the SR of the hot oxygen burner that generates the hot oxidant stream, without changing the size of orifice 206; or dividing the flow of the oxidant stream into multiple slower streams.

The product stream 17 typically contains hydrogen and CO, and methane, and one or more hydrocarbons containing 2 to 8 carbon atoms and 0 to 2 oxygen atoms.

It has been determined that carrying out the reaction in reactor 15 as described herein does not negatively affect the ability to provide a desired methane in the product stream 17 to the extent that the operator desires that methane content.

It has also been discovered that the extent to which methane is provided in product stream 17 can be controlled by controlling the reaction conditions in the reactor to be less oxidizing. However, these conditions can lead to increased production of soot compared to a complete conversion case. This invention enables the conversion of the desired species to be reduced, such as by operating the partial oxidation more fuel rich (i.e. with a lower SR) while reducing or eliminating the soot formation that would otherwise occur by reducing the momentum of the oxidant stream 13 that is fed into the feed stream 11.

The ability of the methods of the present invention to lessen the formation of soot in the product stream is enhanced when partial oxidation reaction conditions are employed in which the formation of soot is influenced by the momentum of the oxidant stream or by the ratio of the momentums of the oxidant stream and the feed stream. Thus, it is preferred not to employ conditions under which the components of the feed stream undergo heating to near or above the cracking temperature before they undergo the partial oxidation reactions (as could be the case if the oxidant stream and the feed stream are mixed inadequately), or under which the feed stream as fed to the reactor is already so hot that one or more carbonaceous components of the feed stream have approached or reached the temperature at which they would undergo cracking

EXAMPLES

Partial oxidation of a feedstock with a hot oxidant stream was carried out in two runs in which the oxidant characteristics differed. The composition and properties of the feedstock fed to the two runs were as follows:

| Composition: | |
| --- | --- |
| Nitrogen | 18.8 vol. % |
| Natural gas | 25.1 vol. % |
| Hydrogen | 55.1 vol. % |
| Benzene | 1.0 vol. % |
| Temperature | 750° F. |
| Feed rate | 1197 scfh |

The oxidant stream was produced by reacting oxygen at 360-370 scfh with natural gas at about 60 scfh, at an SR of 3.0 in a hot oxygen burner to generate a stream of hot oxidant. The feedstock stream and the oxidant stream were fed to a partial oxidation reactor to mix and react in the reactor, at an SR of 0.24.

In Run A, the hot oxidant stream exited the hot oxygen burner through an orifice 0.25 inch in diameter, at a velocity of 2950 fps and a momentum of 28.7 lb·ft/s$^2$. The average temperature of the oxidant stream was about 2270° F.

In Run B, the hot oxidant stream exited the hot oxygen burner through an orifice 0.45 inch in diameter, at a velocity of 932 fps and a momentum of 9.1 lb·ft/s$^2$. The average temperature of the oxidant stream was about 2300° F.

The product streams produced in each run had the following characteristics:

| Composition (vol. %, dry) | Run A | Run B |
| --- | --- | --- |
| Carbon monoxide | 16.8% | 20.2% |
| Carbon dioxide | 0.8% | 1.5% |
| Methane | 2.0% | 1.7% |
| Hydrogen | 62.4% | 68.1% |

In each run the product stream was passed through a filter as it emerged from the partial oxidation reactor. The filter from Run A contained significant amounts of soot which collected on the filter as a dark deposit. The filter from Run B showed essentially no collected material, indicating that essentially no soot formed in the partial oxidation under the conditions of Run B.

What is claimed is:

1. An improved method of treating a gaseous feed material that contains one or more hydrocarbons, the method comprising feeding a feed stream consisting of the gaseous feed material to a reactor, and feeding a stream consisting of hot oxidant containing oxygen to the reactor, and adding together in the reactor the hot oxidant stream containing oxygen with the feed stream of the gaseous feed material, to mix in the reactor under reaction conditions effective to partially oxidize one or more hydrocarbons in said feed material to produce a product stream that contains hydrogen and CO, while maintaining the ratio of the momentum of the oxidant stream relative to the momentum of the feed stream, when the oxidant stream is added to the feed stream, so that said ratio is less than the ratio of the momentum of the oxidant stream relative to the momentum of the feed stream at which, under otherwise identical reaction conditions including the temperature of the feed stream, the temperature of the oxidant stream, and the stoichiometric ratio, the soot content of the product stream is 5 gm/Nm$^3$ higher than the soot content of the feed stream to which the oxidant stream is added.

2. The method of claim 1 comprising maintaining the ratio of the momentum of the oxidant stream relative to the momentum of the feed stream, when the oxidant stream is added to the feed stream, so that said ratio is less than the ratio of the momentum of the oxidant stream relative to the momentum of the fed stream at which, under otherwise identical reaction conditions, the soot content of the product stream is 2 gm/Nm$^3$ higher than the soot content of the feed stream to which the oxidant stream is added.

3. The method of claim 1 comprising maintaining the ratio of the momentum of the oxidant stream relative to the momentum of the feed stream, when the oxidant stream is added to the feed stream, so that said ratio is less than the ratio of the momentum of the oxidant stream relative to the momentum of the fed stream at which, under otherwise identical reaction conditions, the soot content of the product stream is 1 gm/Nm$^3$ higher than the soot content of the feed stream to which the oxidant stream is added.

4. The method of claim 1 wherein the feed material has been obtained by gasification of carbonaceous feed material.

5. The method of claim 1 wherein the feed material comprises natural gas.

6. An improved method of treating a gaseous feed material that contains one or more hydrocarbons, the method comprising feeding a feed stream consisting of the gaseous feed material to a reactor, and feeding a stream consisting of hot oxidant containing oxygen to the reactor, and adding together in the reactor the hot oxidant stream containing oxygen with the feed stream of the gaseous feed material, to mix in the reactor under reaction conditions effective to partially oxidize one or more hydrocarbons in said feed material to produce a product stream that contains hydrogen and CO, while maintaining the ratio of the momentum of the oxidant stream relative to the momentum of the feed stream, when the oxidant stream is added to the feed stream, so that the soot content of the product stream is less than 5 gm/Nm$^3$ higher than the soot content of the feed stream.

7. The method of claim 6 comprising maintaining the ratio of the momentum of the oxidant stream relative to the momentum of the feed stream, when the oxidant stream is added to the feed stream, so that the soot content of the product stream is less than 2 gm/Nm$^3$ higher than the soot content of the feed stream.

8. The method of claim 6 comprising maintaining the ratio of the momentum of the oxidant stream relative to the momentum of the feed stream, when the oxidant stream is added to the feed stream, so that the soot content of the product stream is less than 1 gm/Nm$^3$ higher than the soot content of the feed stream.

9. The method of claim 6 wherein the feed material has been obtained by gasification of carbonaceous feed material.

10. The method of claim 6 wherein the feed material comprises natural gas.

11. An improved method of treating a gaseous feed material that contains one or more hydrocarbons, the method comprising feeding a feed stream consisting of the gaseous feed material to a reactor, and feeding a stream consisting of hot oxidant containing oxygen to the reactor, and adding together in the reactor the hot oxidant stream containing oxygen with the feed stream of the gaseous feed material, to mix in the reactor under reaction conditions effective to partially oxidize one or more hydrocarbons in said feed material to produce a product stream that contains hydrogen and CO, under reaction conditions, including the temperature of the feed stream, the temperature of the oxidant stream, and the stoichiometric ratio, under which if the partial oxidation reaction is practiced with a given ratio of the momentum of the oxidant stream relative to the momentum of the feed stream the soot content of the product stream would be 5 gm/Nm$^3$ higher than the soot content of the feed stream, and carrying out the partial oxidation reaction with a ratio of the momentum of the oxidant stream relative to the momentum of the feed stream when the streams are added together that is less than the given ratio but under otherwise identical reaction conditions, wherein the soot content of the product stream is less than 5 gm/Nm$^3$ higher than the soot content of the feed stream.

12. The method of claim 11 wherein said oxidant stream and said feed stream are mixed and reacted under reaction conditions, including the temperature of the feed stream, the temperature of the oxidant stream, and the stoichiometric ratio, under which if the partial oxidation reaction is practiced with a given ratio of the momentum of the oxidant stream relative to the momentum of the feed stream the soot content of the product stream would be 2 gm/Nm$^3$ higher than the soot content of the feed stream, and wherein the soot content of the product stream is less than 2 gm/Nm$^3$ higher than the soot content of the feed stream.

13. The method of claim 11 wherein said oxidant stream and said feed stream are mixed and reacted under reaction conditions, including the temperature of the feed stream, the temperature of the oxidant stream, and the stoichiometric ratio, under which if the partial oxidation reaction is practiced with a given ratio of the momentum of the oxidant stream relative to the momentum of the feed stream the soot content of the product stream would be 1 gm/Nm$^3$ higher than the soot content of the feed stream, and wherein the soot content of the product stream is less than 1 gm/Nm$^3$ higher than the soot content of the feed stream.

14. The method of claim 1 or claim 6 or claim 11, wherein the product stream contains methane, and the momentum and the temperature of the oxidant stream added to the feed stream are controlled to control the amount of methane in the product stream.

* * * * *